United States Patent
Patel et al.

(10) Patent No.: US 9,969,346 B2
(45) Date of Patent: May 15, 2018

(54) AIRBAG RESTRAINT SYSTEM

(71) Applicant: Ford Global Technologies, LLC, Dearborn, MI (US)

(72) Inventors: Deepak Patel, Canton, MI (US); Zhibing Deng, Northville, MI (US); Behrooz Shahidi, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 15/245,368

(22) Filed: Aug. 24, 2016

(65) Prior Publication Data
US 2018/0056917 A1   Mar. 1, 2018

(51) Int. Cl.
| | |
|---|---|
| *B60R 21/213* | (2011.01) |
| *B60R 21/232* | (2011.01) |
| *B60R 21/2338* | (2011.01) |
| *B60R 21/239* | (2006.01) |
| *B60R 21/261* | (2011.01) |

(52) U.S. Cl.
CPC .......... *B60R 21/213* (2013.01); *B60R 21/232* (2013.01); *B60R 21/239* (2013.01); *B60R 21/2338* (2013.01); *B60R 2021/23382* (2013.01); *B60R 2021/2615* (2013.01)

(58) Field of Classification Search
CPC ... B60R 21/213; B60R 21/232; B60R 21/239; B60R 21/262; B60R 21/264; B60R 21/2338; B60R 2021/0048; B60R 2021/23308; B60R 2021/23382; B60R 2021/2615; B60R 2021/2617; B60R 2021/01225; B60R 2021/01231; B60R 2021/2633; B60R 2021/2642; B60R 2021/2648; B60R 2021/23514
See application file for complete search history.

(56) References Cited

U.S. PATENT DOCUMENTS

| | | | | |
|---|---|---|---|---|
| 5,464,250 A | * | 11/1995 | Sato | ................ B60R 21/23138 280/730.1 |
| 5,544,913 A | * | 8/1996 | Yamanishi | .......... B60R 21/0428 280/730.2 |

(Continued)

FOREIGN PATENT DOCUMENTS

| | | | |
|---|---|---|---|
| JP | 2012046175 A | * | 3/2012 |
| JP | 2012091559 A | * | 5/2012 |

(Continued)

OTHER PUBLICATIONS

Search Report from United Kingdom Intellectual Property Office dated Jan. 23, 2018 regarding GB Application No. GB1713269.7 (3 pages).

*Primary Examiner* — Laura Freedman
(74) *Attorney, Agent, or Firm* — Frank A. MacKenzie; Bejin Bieneman PLC

(57) ABSTRACT

A restraint system includes a curtain airbag having an outboard layer and an inboard layer, an extension layer fixed to the inboard layer, and an inflator. The outboard and inboard layers define a first inflation chamber therebetween. The extension layer defines a second inflation chamber between the extension layer and the inboard layer. The inflator is in communication with the first and second inflation chambers. The first and second inflation chambers are fluidly isolated from each other.

20 Claims, 7 Drawing Sheets

(56) References Cited

U.S. PATENT DOCUMENTS

| | | | |
|---|---|---|---|
| 5,797,621 A * | 8/1998 | Ono | B60R 21/233 |
| | | | 280/729 |
| 6,042,141 A * | 3/2000 | Welch | B60R 21/232 |
| | | | 280/729 |
| 6,158,767 A * | 12/2000 | Sinnhuber | B60R 21/213 |
| | | | 280/730.2 |
| 6,253,683 B1 * | 7/2001 | Fukabori | B60R 21/272 |
| | | | 102/530 |
| 6,314,888 B1 * | 11/2001 | Muller | B60R 21/2644 |
| | | | 102/530 |
| 6,543,804 B2 * | 4/2003 | Fischer | B60R 21/23184 |
| | | | 280/730.2 |
| 6,616,177 B2 * | 9/2003 | Thomas | B60R 21/232 |
| | | | 280/729 |
| 6,695,341 B2 * | 2/2004 | Winarto | B60R 21/08 |
| | | | 280/730.2 |
| 6,851,706 B2 | 2/2005 | Roberts et al. | |
| 6,916,039 B2 * | 7/2005 | Abe | B60R 21/206 |
| | | | 280/729 |
| 7,086,663 B2 * | 8/2006 | Honda | B60R 21/207 |
| | | | 280/730.2 |
| 7,264,269 B2 * | 9/2007 | Gu | B60R 21/232 |
| | | | 280/729 |
| 7,350,804 B2 | 4/2008 | Bakhsh et al. | |
| 7,618,057 B2 * | 11/2009 | Pinsenschaum | B60R 21/232 |
| | | | 280/729 |
| 7,770,917 B2 * | 8/2010 | Henderson | B60R 21/232 |
| | | | 280/730.2 |
| 7,828,322 B2 * | 11/2010 | Breuninger | B60R 21/231 |
| | | | 280/730.2 |
| 8,020,888 B2 * | 9/2011 | Cheal | B60R 21/213 |
| | | | 280/729 |
| 8,408,591 B2 * | 4/2013 | Walston | B60R 21/213 |
| | | | 280/730.1 |
| 8,613,465 B2 * | 12/2013 | Nozaki | B60R 21/23138 |
| | | | 280/729 |
| 8,636,301 B1 | 1/2014 | Wang et al. | |
| 8,814,202 B2 | 8/2014 | Matsushita et al. | |
| 8,882,139 B2 * | 11/2014 | Kawamura | B60R 21/213 |
| | | | 280/730.2 |
| 8,991,858 B2 * | 3/2015 | Rick | B60R 21/232 |
| | | | 280/729 |
| 9,126,558 B2 * | 9/2015 | Kawamura | B60R 21/213 |
| 9,139,154 B2 | 9/2015 | Abramoski et al. | |
| 9,150,187 B1 * | 10/2015 | Schiftan | B60R 21/233 |
| 9,227,590 B2 * | 1/2016 | Fujiwara | B60R 21/23138 |
| 9,446,735 B1 * | 9/2016 | Jayasuriya | B60R 21/232 |
| 2003/0132619 A1 | 7/2003 | Winarto et al. | |
| 2006/0017267 A1 | 1/2006 | Fink | |
| 2006/0097492 A1 | 5/2006 | Bakhsh et al. | |
| 2008/0012275 A1 | 1/2008 | Pinsenschaum et al. | |
| 2015/0054265 A1 | 2/2015 | Deng et al. | |
| 2016/0229370 A1 * | 8/2016 | Hampson | B60R 21/232 |

FOREIGN PATENT DOCUMENTS

| | | | |
|---|---|---|---|
| JP | 2014166797 A | * | 9/2014 |
| JP | 2014166798 A | * | 9/2014 |
| JP | 5634186 B2 | | 12/2014 |

* cited by examiner

AIRBAG RESTRAINT SYSTEM

BACKGROUND

Vehicles, such as automobiles, may include airbags designed to inflate and be impacted by occupants during a side impact of the vehicle. For example, a curtain airbag may deploy downwardly from a roof rail alongside windows during a side collision, and the curtain airbag may be impacted by an occupant adjacent to the curtain airbag.

Vehicles may be subject to side impact testing standards for the curtain airbags. As one example, the National Highway Traffic Safety Administration (NHTSA) provides a test procedure designed to simulate a vehicle experiencing a side collision with a pole. The NHTSA procedure provides that a test vehicle holding a test dummy as an occupant collides sideways at 20 miles per hour into a rigid vertical pole 10 inches in diameter. One proposed measure of injury for this test is a brain injury criterion (BrIC). The BrIC is a function of the maximum pitch, roll, and yaw of a head of the test dummy during the test, specifically, $$BrIC = \sqrt{\left(\frac{\omega_{xmax}}{66.25_{rad}}\right)^2 + \left(\frac{\omega_{ymax}}{56.45_{rad}}\right)^2 + \left(\frac{\omega_{zmax}}{42.87_{rad}}\right)^2},$$

in which $\omega_{xmax}$ is the maximum roll, $\omega_{ymax}$ is the maximum pitch, and $\omega_{zmax}$ is the maximum yaw, all measured in radians per second.

DETAILED DESCRIPTION

Figure 1:
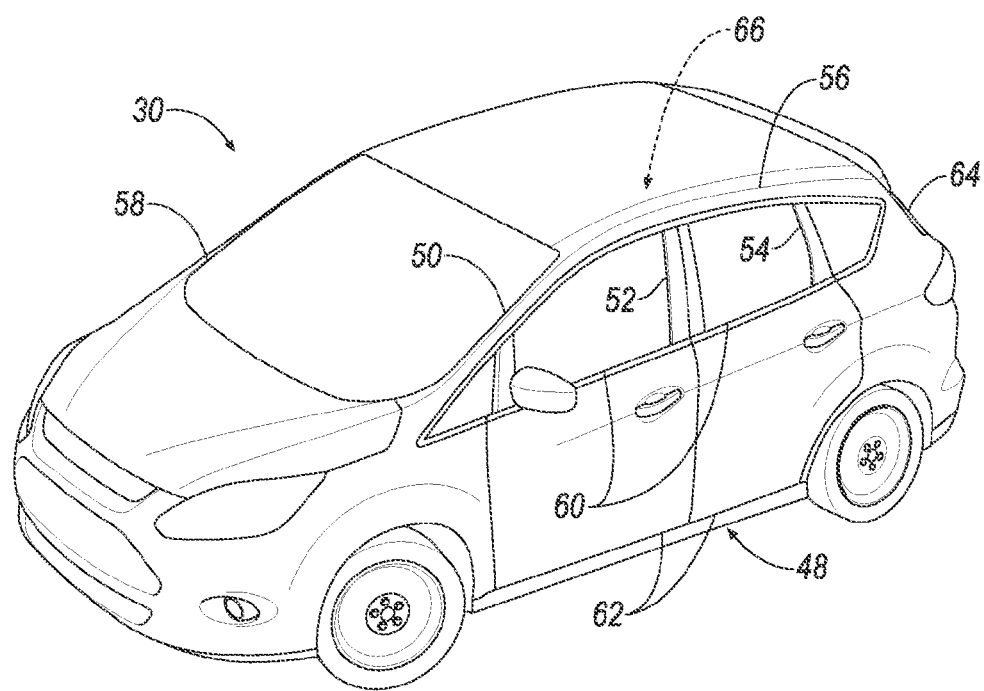
FIG. 1 is a perspective view of a vehicle.

With reference to the Figures, wherein like numerals indicate like parts throughout the several views, a restraint system 32 for a vehicle 30 includes a curtain airbag 34 having an outboard layer 36 and an inboard layer 38, an extension layer 40 fixed to the inboard layer 38, and an inflator 42. The outboard and inboard layers 36, 38 define a first inflation chamber 44 therebetween. The extension layer 40 defines a second inflation chamber 46 between the extension layer 40 and the inboard layer 38. The inflator 42 is in communication with the first and second inflation chambers 44, 46. The first and second inflation chambers 44, 46 are fluidly isolated from each other. (The adjectives "first," "second," and "third" are used throughout this document as identifiers and are not intended to signify importance or order.)

The second inflation chamber 46 of the curtain airbag 34 may reduce tilting and twisting of a head of an occupant during a side impact. Specifically, the second inflation chamber 46 catches the head of the occupant and may reduce the likelihood and/or severity of injury from the roll and/or the yaw of the head of the occupant as the occupant moves toward the curtain airbag 34 during the side impact.

With reference to FIG. 1, the vehicle 30 may include a body 48. The body 48 may be of a unibody construction in which at least some of the body 48 is exposed and may present a class-A surface (not numbered), i.e., a surface specifically manufactured to have a high-quality, finished aesthetic appearance free of blemishes. The body 48 may, alternatively, be of a body-on-frame construction, or of any other suitable construction. The body 48 may be formed of any suitable material, for example, steel, aluminum, etc.

The body 48 of the vehicle 30 may include A pillars 50, B pillars 52, C pillars 54, and roof rails 56. The A pillars 50 may extend between a windshield 58 and windows 60. The B pillars 52 may extend between the windows 60 of adjacent doors 62. The C pillars 54 may extend between the windows 60 and a backlite 64. The roof rails 56 extend along the windows 60 from the A pillar 50 to the B pillar 52 to the C pillar 54.

The windshield 58, windows 60, and backlite 64 may be formed of any suitably durable transparent material, including glass such as laminated, tempered glass or plastic such as Plexiglas or polycarbonate.

Figure 2:
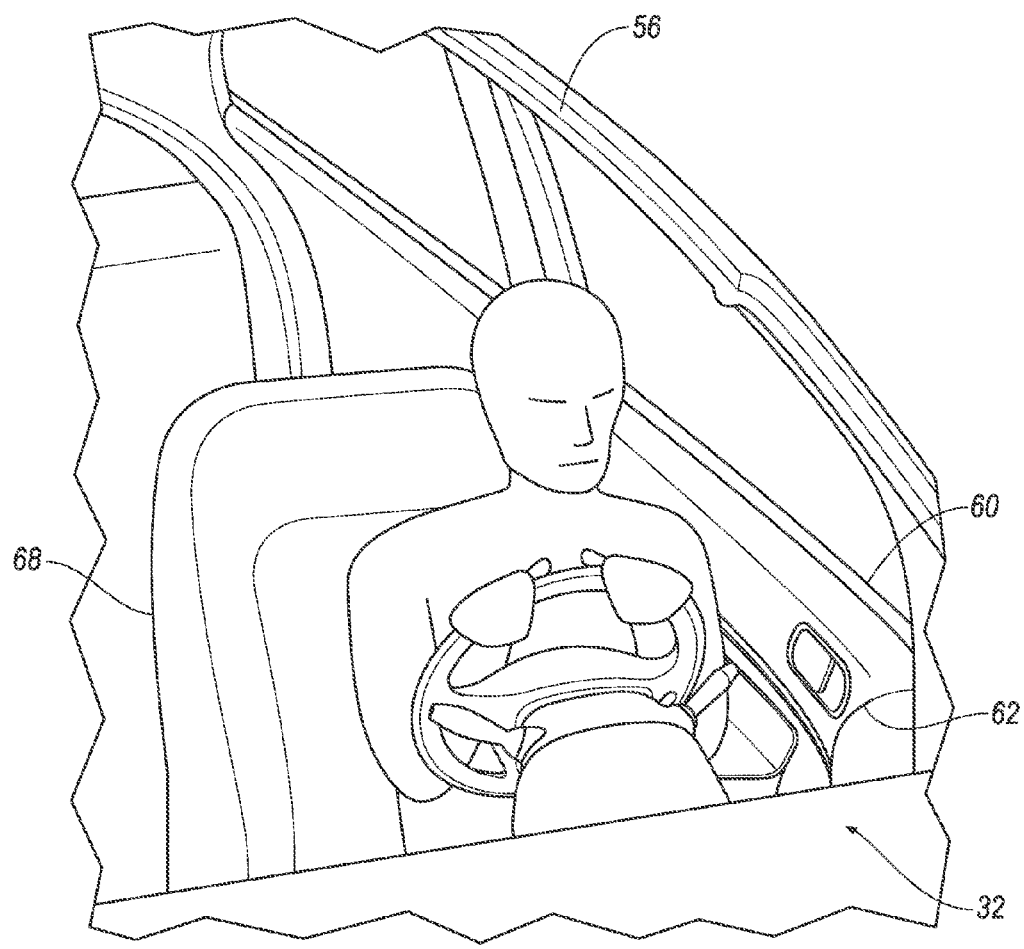
FIG. 2 is a perspective view of a passenger cabin of the vehicle with a curtain airbag in an uninflated position.
Figure 3:
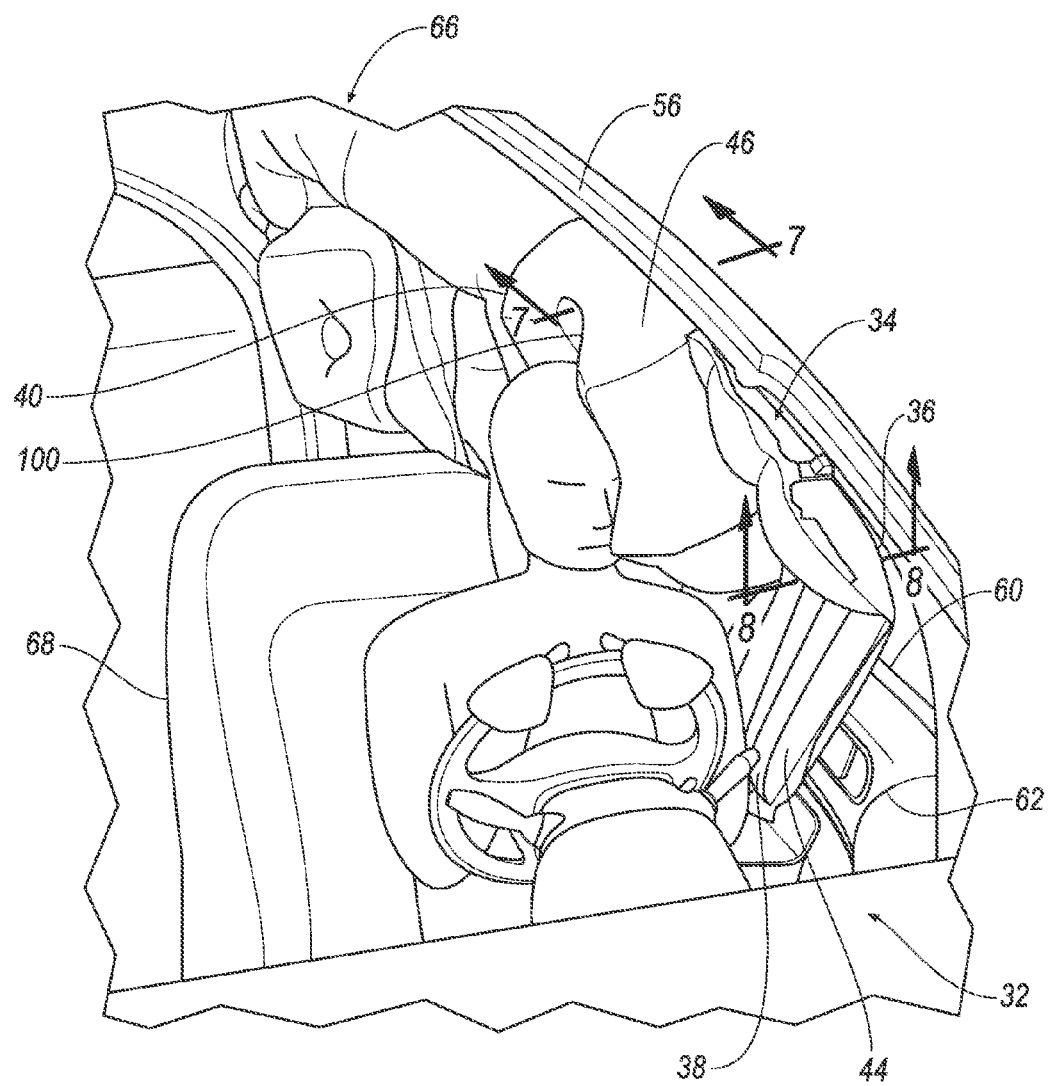
FIG. 3 is a perspective view of the passenger cabin of the vehicle with the curtain airbag in an inflated position.

With reference to FIGS. 2 and 3, the vehicle 30 includes a passenger cabin 66 to house occupants, if any, of the vehicle 30. The passenger cabin 66 includes one or more seats 68, for example, front seats 68 disposed at a front of the passenger cabin 66 and back seats 68 disposed behind the front seats 68. The passenger cabin 66 may also include third-row seats (not shown) at a rear of the passenger cabin 66. In FIGS. 2 and 3, the front seat 68 is shown to be a bucket seat, but the seats 68 may be other types. The position and orientation of the seats 68 and components thereof may be adjustable by an occupant.

Figure 4:
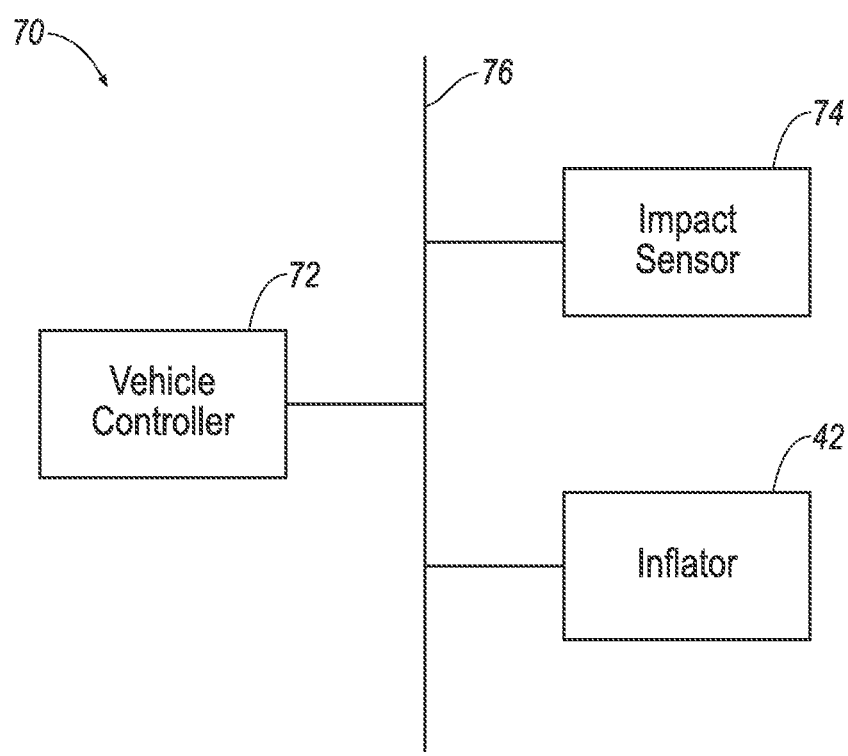
FIG. 4 is a block diagram of a control system for the curtain airbag.

With reference to FIG. 4, a control system 70 of the vehicle 30 may include a vehicle controller 72, an impact sensor 74, and the inflator 42, all in communication through a communications network 76. The control system 70 may control inflation of the curtain airbag 34 during vehicle impact, e.g., a side impact.

The vehicle controller 72 may be a microprocessor-based controller. The vehicle controller 72 may include a processor, memory, etc. The memory of the vehicle controller 72 may include memory for storing instructions executable by the processor as well as for electronically storing data and/or databases.

The control system 70 may transmit signals through a communications network 76 such as a controller area network (CAN) bus, Ethernet, Local Interconnect Network (LIN), and/or by any other wired or wireless communications network.

The impact sensor 74 may be in communication with the vehicle controller 72, e.g., through the communications network 76. The impact sensor 74 is adapted to detect an impact to the vehicle 30. The impact sensor 74 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 74 may be located at numerous points in or on the vehicle 30.

The inflator 42 may be in communication with the first and second inflation chambers 44, 46, as set forth further below. Upon receiving a signal from, e.g., the vehicle controller 72, the inflator 42 may inflate the curtain airbag 34 with an inflatable medium, such as a gas. The inflator 42 may be, for example, a pyrotechnic inflator that uses a chemical reaction to drive inflation medium to the curtain airbag 34. The inflator 42 may be of any suitable type, for example, a cold-gas inflator.

Figure 6:
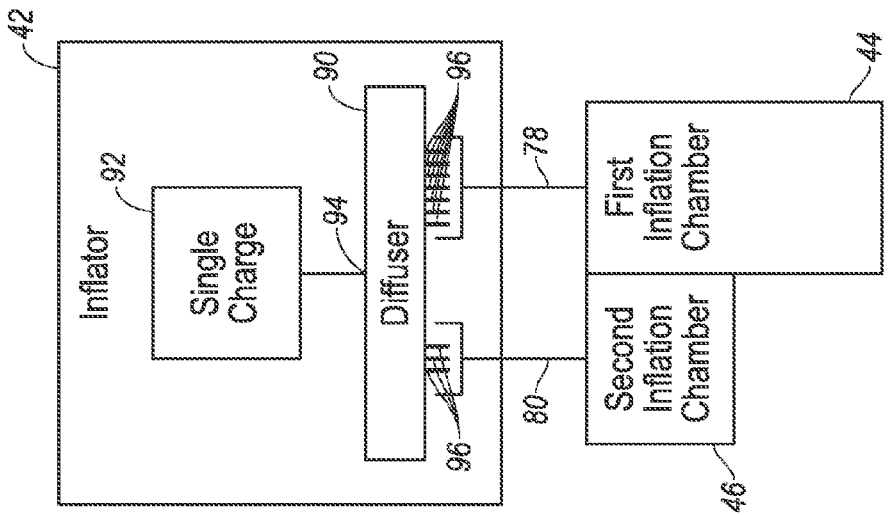
FIG. 6 is an alternative block diagram of the curtain airbag and the inflator.
Figure 5:
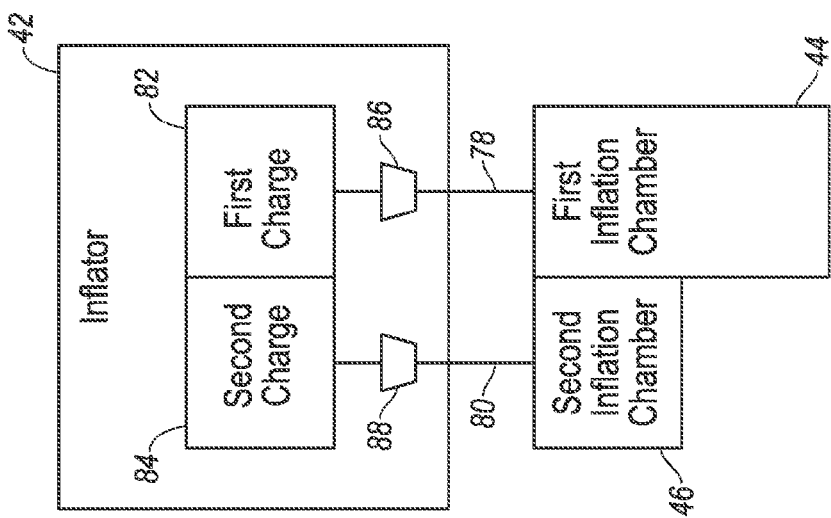
FIG. 5 is a block diagram of the curtain airbag and an inflator.

With reference to FIGS. 5 and 6, a first conduit 78 extends from the inflator 42 to the first inflation chamber 44, and a second conduit 80 extends from the inflator 42 to the second inflation chamber 46. The conduits 78, 80 fluidly connect the inflator 42 with the inflation chambers 44, 46, respectively, to provide inflation medium from the inflator 42 to the inflation chambers 44, 46.

The inflator 42 may include one or more charges combustible to provide inflation medium to the curtain airbag 34. As one example, with reference to FIG. 5, the inflator 42 may include a first charge 82 combustible to provide inflation medium to the first conduit 78 and a second charge 84 separate from the first charge 82 and combustible to provide inflation medium to the second conduit 80. The first charge 82 may be larger than the second charge 84; thus, the first inflation chamber 44 may receive more inflation medium than the second inflation chamber 46 in the event that the inflator 42 activates, e.g., in the event the first inflation chamber 44 is larger than the second inflation chamber 46 and/or to inflate the first inflation chamber 44 more quickly than the second inflation chamber 46. A first nozzle 86 connects the first charge 82 and the first conduit 78, and a second nozzle 88 connects the second charge 84 and the second conduit 80. As another example, with reference to FIG. 6, the inflator 42 may include a single charge 92, as set forth further below.

The charges 82, 84, 92 may be formed of a solid mixture of substances that, when ignited, react to produce the inflation medium, which is a gas. For example, the charges 82, 84, 92 may be formed of sodium azide ($NaNO_3$), potassium nitrate ($KNO_3$), and silicon dioxide ($SiO_2$), which react to form nitrogen gas ($N_2$). The charges 82, 84, 92 may have the same or different chemical mixtures.

Alternatively or additionally, with reference to FIG. 6, the inflator 42 may include a diffuser 90 disposed between the inflator 42 and the first and second conduits 78, 80 and positioned to distribute inflation medium to the first conduit 78 and the to the second conduit 80, i.e., to divide the inflation medium between the first conduit 78 and the second conduit 80. The diffuser 90 may be connected to the first and second charges 82, 84 or, as shown in FIG. 6, may be connected to a single charge 92. The diffuser 90 may have a single inlet 94 in communication with the single charge 92 and a plurality of outlets 96 in communication with the first and second conduits 78, 80. For example, the diffuser 90 may be a cylindrical cap with an open end serving as the inlet 94 and a plurality of holes on a closed end and/or a side serving as outlets 96. The diffuser 90 may be positioned to distribute more inflation medium to the first conduit 78 than to the second conduit 80. For example, more outlets 96 may be in communication with the first conduit 78 than with the second conduit 80.

Figure 7:
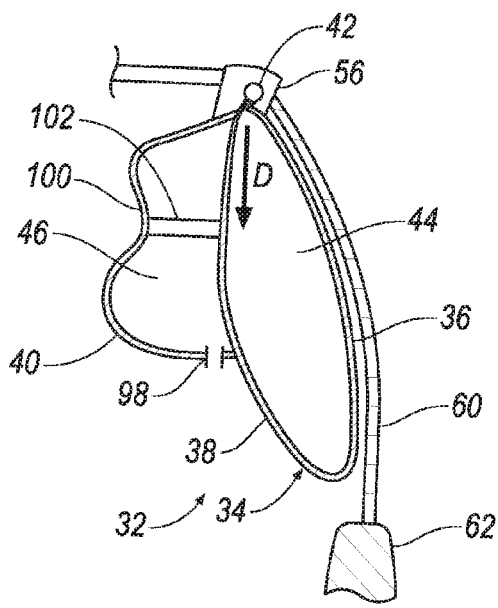
FIG. 7 is a cross-section of the curtain airbag along line 7 of FIG. 3.
Figure 8:
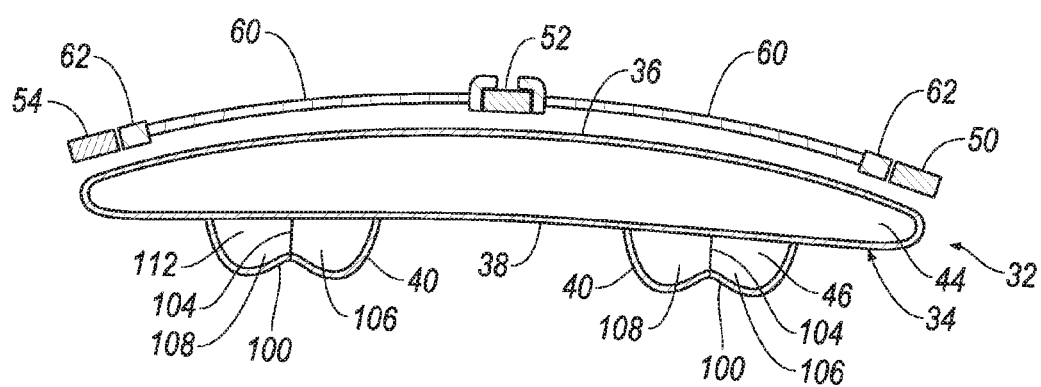
FIG. 8 is a cross-section of the curtain airbag along line 8 of FIG. 3.

With reference to FIGS. 3 and 7-8, the curtain airbag 34 has the first and second inflation chambers 44, 46. The curtain airbag 34 is inflatable from an uninflated position disposed along the roof rail 56, as shown in FIG. 2, to an inflated position with the first inflation chamber 44 adjacent the window 60, as shown in FIGS. 3 and 7-8.

The curtain airbag 34 may be formed of any suitable airbag material, for example, a woven polymer. For example, the curtain airbag 34 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIGS. 7-8, the curtain airbag 34 has the outboard layer 36 and the inboard layer 38. The outboard layer 36 and the inboard layer 38 define the first inflation chamber 44 therebetween. The first inflation chamber 44 is adjacent the window 60 when the curtain airbag 34 is in the inflated position. The outboard layer 36 and the inboard layer 38 may be integral with each other, i.e., from a single panel, or may be formed by multiple panels attached to each other in any suitable fashion, e.g., sewing, ultrasonic welding, etc.

The extension layer 40 is fixed to, i.e., in contact with and connected to, the inboard layer 38. The extension layer 40 may be sewn or attached to the inboard layer 38. When the curtain airbag 34 is in the inflated position and the seat 68 adjacent to the curtain airbag 34 is occupied, the second inflation chamber 46 may be positioned between a head of an occupant and the first inflation chamber 44.

The extension layer 40 defines the second inflation chamber 46 between the extension layer 40 and the inboard layer 38. In other words, the second inflation chamber 46 extends from the inboard layer 38 to the extension layer 40, as shown in FIGS. 7 and 8. As set forth above, the outboard layer 36 and the inboard layer 38 define the first inflation chamber 44. In other words, the first inflation chamber 44 extends from the inboard layer 38 to the outboard layer 36. The outboard layer 36 is directly exposed to both the first inflation chamber 44 and the second inflation chamber 46 and separates the first inflation chamber 44 from the second inflation chamber 46.

The second inflation chamber 46 may be aligned one of the windows 60 when the curtain airbag 34 is in the inflated position. Specifically, the second inflation chamber 46 may be designed, i.e., sized, shaped, and positioned, to be between the head of an occupant and one of the windows 60 to absorb energy from the head of the occupant during a side impact of the vehicle 30. In other words, the second inflation chamber 46 may be designed relative to one of the seats 68 and adjacent door 62 and window 60 such that the inflation chamber 46 is aligned with the head of the occupant seated in that seat 68 when in the inflated position.

With reference to FIG. 7, the first and second inflation chambers 44, 46 are fluidly isolated from each other. The inflation chambers 44, 46 are in fluid communication with the inflator 42 but not with each other. The first and second inflation chambers 44, 46 share a panel. Specifically, the inboard layer 38 defines both the first and the second inflation chambers 44, 46. The inboard layer 38 does not have vents communicating between the inflation chambers 44, 46.

The outboard layer 36 and the inboard layer 38 may be coated, that is, the first inflation chamber 44 may include only panels with a coating, while the extension layer 40 is uncoated. The second inflation chamber 46 may include at least one uncoated panel. For example, the extension layer 40 may be uncoated. When the curtain airbag 34 is in the inflated position, the inflation medium may leak faster through uncoated panels than through coated panels; therefore, the inflation medium may exit the second inflation chamber 46 faster than the first inflation chamber 44, making the second inflation chamber 46 softer than the first inflation chamber 44.

Figure 9:
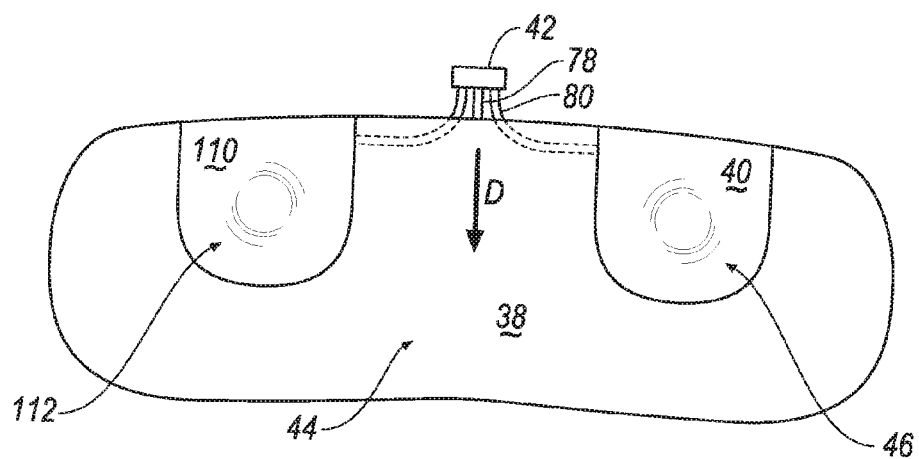
FIG. 9 is a side view of the inflator and the curtain airbag in the inflated position.

With reference to FIGS. 7 and 9, the first inflation chamber 44 may extend farther from the inflator 42 in a direction D along the inboard layer 38 than the second inflation chamber 46 extends in the direction D along the inboard layer 38 when the inflation chambers 44, 46 are in the inflated positions. Specifically, from the perspective of the passenger cabin 66, the first inflation chamber 44 may cover the window 60 or two windows 60 while the second inflation chamber 46 covers one of the windows 60. In other words, the first inflation chamber 44 may be longer than the second inflation chamber 46 in the direction D away from the roof rail 56. The direction D may be in a general downward direction from the roof rail 56, e.g., generally vertical.

Figure 10:
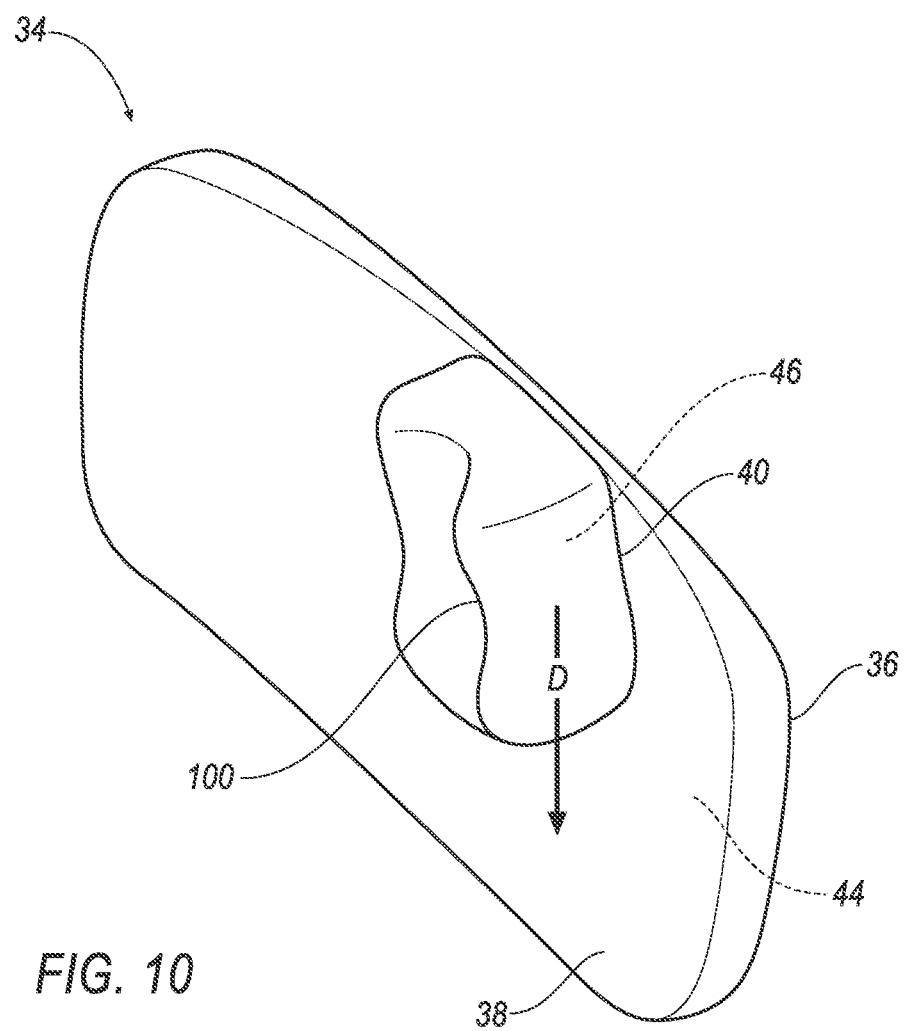
FIG. 10 is a perspective view of the curtain airbag.

With reference to FIGS. 9 and 10, an edge of the extension layer 40 may border an edge of the inboard layer 38 adjacent the roof rail 56 or may be spaced from the edge of the inboard layer 38 adjacent the roof rail 56. Other edges of the extension layer 40 are spaced from edges of the inboard layer 38 not adjacent the roof rail 56.

With reference to FIG. 7, the second inflation chamber 46, specifically the extension layer 40, may include a vent 98 configured to vent the second inflation chamber 46 external to the first and second inflation chambers 44, 46. In other words, the vent 98 leads from the second inflation chamber 46 to the passenger cabin 66 and not to the first inflation chamber 44. The vent 98 may be, for example, an open vent, a one-way vent, a two-way vent, or an active vent.

With reference to FIGS. 3 and 8, the extension layer 40 may include a depression 100 when the second inflation chamber 46 is in an inflated position. The second inflation chamber 46 does not extend as far from the first inflation chamber 44 at the depression 100 as at areas located closer to an edge of the extension layer 40. The depression 100 may be positioned and sized to receive a head of an occupant.

With reference to FIG. 7, a tether 102 may extend inside the second inflation chamber 46 from the inboard layer 38 to the extension layer 40. The tether 102 may be shorter than a distance between connection points of the tether 102 when the curtain airbag 34 is in the inflated position in the absence of the tether 102. The tether 102 may thus pull on the extension layer 40 when the curtain airbag 34 is in the inflated position and may create the depression 100. The tether 102 may have a straplike shape and may be formed of the same fabric as the extension layer 40 or the inboard layer 38 or of a different material.

With reference to FIG. 8, alternatively or additionally to the tether 102, a panel 104 may extend inside the second inflation chamber 46 from the inboard layer 38 to the extension layer 40 and may divide the second inflation chamber 46 into a forward chamber 106 and a rear chamber 108. The panel 104 may be dimensioned to create the depression 100 when the curtain airbag 34 is in the inflated position. The panel 104 may completely separate the second inflation chamber 46 into the forward and rear chambers 106, 108. The panel 104 may include vents (not shown) between the forward and rear chambers 106, 108 or gaps (not shown) at a top and/or a bottom of the second inflation chamber 46. The vents may be, for example, open vents, one-way vents, two-way vents, or active vents.

With reference to FIG. 9, the curtain airbag 34 may include a second extension layer 110 spaced from the extension layer 40 and defining a third inflation chamber 112 between the second extension layer 110 and the inboard layer 38. The second extension layer 110 may have the same characteristics as the extension layer 40, for example, having the depression 100 and/or the vent 98 and being uncoated. The third inflation chamber 112 may have the same characteristics as the second inflation chamber 46, such as the tether 102 and/or the panel 104.

In the event of a side impact, the impact sensor 74 may detect the impact and transmit a signal through the communications network 76 to the vehicle controller 72. The vehicle controller 72 may transmit a signal through the communications network 76 to the inflator 42. The inflator 42 may discharge and inflate the curtain airbag 34.

Specifically, the first and second charge 84 may discharge and produce inflation medium. The inflation medium flows through the first nozzle 86 and the first conduit 78 to the first inflation chamber 44 and through the second nozzle 88 and the second conduit 80 to the second inflation chamber 46, inflating the curtain airbag 34 from the uninflated position to the inflated position. The first inflation chamber 44 may inflate faster than the second inflation chamber 46 because the first charge 82 is larger than the second charge 84.

Alternatively, the single charge 92 may discharge and produce inflation medium. The inflation medium flows through the diffuser 90 to the first conduit 78 and then the first inflation chamber 44 and through the diffuser 90 to the second conduit 80 and then the second inflation chamber 46. The first inflation chamber 44 may inflate faster than the second inflation chamber 46 because the diffuser 90 is positioned to distribute more inflation medium to the first conduit 78 than to the second conduit 80.

In either alternative, an occupant of the vehicle 30 may have momentum carrying the occupant into the curtain airbag 34. The depression 100 receives a head of the occupant and may prevent the head from significantly twisting or tilting. The momentum of the occupant into the curtain airbag 34 causes the inflation chambers 44, 46 to lose inflation medium. The second inflation chamber 46 may lose inflation medium faster than the first inflation chamber 44. Specifically, the inflation medium may exit the second inflation chamber 46 through the vent 98 or through the uncoated extension layer 40 faster than the inflation medium exits the first inflation chamber 44, which may lack any vent 98 and/or be coated. The relative softness of the second inflation chamber 46 may further prevent twisting or tilting of the head of the occupant while the occupant comes to rest.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   a curtain airbag having an outboard layer and an inboard layer defining a first inflation chamber therebetween;
   an extension layer fixed to the inboard layer and defining a second inflation chamber between the extension layer and the inboard layer; and
   an inflator in communication with the first and second inflation chambers;

wherein the first and second inflation chambers are fluidly isolated from each other and are inflatable to an inflated position; and when the second inflation chamber is in the inflated position, the extension layer includes a depression and a raised area completely surrounding the depression, the depression being closer to the inboard layer than the raised area is to the inboard layer.

2. The restraint system of claim 1, further comprising a first conduit from the inflator to the first inflation chamber, and a second conduit from the inflator to the second inflation chamber.

3. The restraint system of claim 2, wherein the inflator includes a first charge combustible to provide inflation medium to the first conduit, and a second charge separate from the first charge and combustible to provide inflation medium to the second conduit.

4. The restraint system of claim 3, wherein the first charge is larger than the second charge.

5. The restraint system of claim 2, further comprising a diffuser between the inflator and the first and second conduits and positioned to distribute inflation medium to the first conduit and to the second conduit.

6. The restraint system of claim 5, wherein the diffuser is positioned to distribute more inflation medium to the first conduit than to the second conduit.

7. The restraint system of claim 1, wherein the extension layer includes a vent configured to vent the second inflation chamber external to the first and second inflation chambers.

8. The restraint system of claim 1, wherein the extension layer is uncoated.

9. The restraint system of claim 8, wherein the outboard and inboard layers are coated.

10. The restraint system of claim 1, wherein the first inflation chamber extends farther from the inflator in a direction along the inboard layer than the second inflation chamber extends in the direction along the inboard layer when the inflation chambers are in inflated positions.

11. The restraint system of claim 1, further comprising a tether extending inside the second inflation chamber from the inboard layer to the extension layer.

12. The vehicle of claim 11, wherein the tether is attached to the depression.

13. The restraint system of claim 1, further comprising a panel extending inside the second inflation chamber from the inboard layer to the extension layer and dividing the second inflation chamber into a forward chamber and a rear chamber.

14. The restraint system of claim 13, wherein the panel includes vents.

15. The restraint system of claim 1, further comprising a second extension layer spaced from the extension layer and defining a third inflation chamber between the second extension layer and the inboard layer.

16. A vehicle comprising:

a window;

a roof rail extending along the window; and an airbag having first and second inflation chambers and inflatable from an uninflated position disposed along the roof rail to an inflated position with the first inflation chamber adjacent the window;

wherein the first and second inflation chambers share a common panel and are fluidly isolated from each other;

the second inflation chamber is defined by the common panel and an extension layer; and when the second inflation chamber is in the inflated position, the extension layer includes a depression and a raised area completely surrounding the depression, the depression being closer to the common panel than the raised area is to the common panel.

17. The vehicle of claim 16, further comprising an inflator fixed relative to the roof rail, a first conduit from the inflator to the first inflation chamber, and a second conduit from the inflator to the second inflation chamber, wherein the inflator includes a first charge combustible to provide inflation medium to the first conduit and a second charge separate from the first charge and combustible to provide inflation medium to the second conduit.

18. The vehicle of claim 16, further comprising an inflator fixed relative to the roof rail, a first conduit from the inflator to the first inflation chamber, a second conduit from the inflator to the second inflation chamber, and a diffuser between the inflator and the first and second conduits and positioned to distribute inflation medium to the first conduit and to the second conduit.

19. The vehicle of claim 16, wherein the second inflation chamber includes a vent configured to vent the second inflation chamber external to the first and second inflation chambers.

20. The vehicle of claim 16, wherein the first inflation chamber includes only panels with a coating, and the second inflation chamber includes at least one uncoated panel.

* * * * *